US006995309B2

(12) United States Patent
Samadani et al.

(10) Patent No.: US 6,995,309 B2
(45) Date of Patent: Feb. 7, 2006

(54) SYSTEM AND METHOD FOR MUSIC IDENTIFICATION

(75) Inventors: Ramin Samadani, Menlo Park, CA (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 120 days.

(21) Appl. No.: 10/004,211

(22) Filed: Dec. 6, 2001

(65) Prior Publication Data

US 2003/0106413 A1 Jun. 12, 2003

(51) Int. Cl.
*G10H 7/00* (2006.01)
(52) U.S. Cl. .................... 84/603; 84/612; 707/104.1
(58) Field of Classification Search .......... 84/600–603, 84/608–612, 615–618, 622, 623, 634–636, 84/649–656, 666–668, 477 R; 434/307 A; 707/104.1
See application file for complete search history.

(56) References Cited

U.S. PATENT DOCUMENTS

| | | | |
|---|---|---|---|
| 4,350,070 A | 9/1982 | Bahu .......................... 84/1.03 |
| 4,843,562 A | 6/1989 | Kenyon et al. ............. 364/487 |
| 5,210,820 A | 5/1993 | Kenyon |
| 5,261,087 A | 11/1993 | Mukaino .................... 345/600 |
| 5,400,261 A | 3/1995 | Reynolds ................... 364/487 |
| 5,402,339 A | 3/1995 | Nakashima et al. ... 364/419.19 |
| 5,412,154 A | 5/1995 | Takeda et al. ............... 84/622 |
| 5,499,316 A | 3/1996 | Sudoh et al. .............. 395/2.79 |
| 5,616,876 A | 4/1997 | Cluts .......................... 84/609 |
| 5,670,730 A | 9/1997 | Grewe et al. ................ 84/609 |
| 5,712,953 A | 1/1998 | Langs ....................... 395/2.23 |
| 5,739,451 A | 4/1998 | Winsky et al. ............... 84/609 |
| 5,773,741 A | 6/1998 | Eller et al. ................... 84/609 |
| 5,808,223 A | 9/1998 | Kurakake et al. ............ 84/609 |
| 5,874,686 A * | 2/1999 | Ghias et al. .................. 84/609 |
| 5,918,223 A * | 6/1999 | Blum et al. .................... 707/1 |
| 5,925,843 A * | 7/1999 | Miller et al. ................. 84/609 |
| 5,963,957 A * | 10/1999 | Hoffberg ................. 707/104.1 |
| 5,986,200 A | 11/1999 | Curtin .......................... 84/609 |
| 6,006,218 A | 12/1999 | Breese et al. .................. 707/3 |

(Continued)

FOREIGN PATENT DOCUMENTS

WO    WO0104870    1/2001

OTHER PUBLICATIONS

Jayant, N.S. and Noll, P., "Digital Coding of Wave Forms", 4.5.2 A-Law Companding, Prentice Hall, 1984, p.p. 142-145.

*Primary Examiner*—Jeffrey W Donels (57) ABSTRACT

A system and method that allows users to find a song name, artist and performance without having to proceed through many false results. In one aspect, the system and method use signal matching to produce reliable matches. In another aspect, the system and method use a combination of signal and feature representation and an automatic decision rule together with a human-in-the-loop approach. A feature vector and a processed time signal are computed for each song in a database and extracted from a microphone-recorded sample of music. The database songs are first sorted by feature space distance with respect to the feature vector of the recorded sample. The processed time signals of the database songs and the processed time signal from the recorded sample are processed using signal matching. A decision rule presents likely matches to the user for confirmation. Using signal matching, feature-ordered search and a decision rule results in an effective framework for finding a song from a brief microphone recorded sample of music.

29 Claims, 4 Drawing Sheets

U.S. PATENT DOCUMENTS

| | | | |
|---|---|---|---|
| 6,061,680 A | 5/2000 | Scherf et al. ................... 707/3 |
| 6,070,160 A | 5/2000 | Geary ........................... 707/4 |
| 6,081,750 A | 6/2000 | Hoffberg et al. .............. 700/17 |
| 6,121,530 A * | 9/2000 | Sonoda ........................ 84/609 |
| 6,185,527 B1 * | 2/2001 | Petkovic et al. ............ 704/231 |
| 6,188,010 B1 | 2/2001 | Iwamura ..................... 84/609 |
| 6,201,176 B1 * | 3/2001 | Yourlo ........................ 84/609 |
| 6,225,546 B1 | 5/2001 | Kraft et al. ................... 84/609 |
| 6,539,395 B1 * | 3/2003 | Gjerdingen et al. ........ 707/102 |
| 6,630,621 B1 * | 10/2003 | Yamada et al. ............... 84/603 |
| 6,657,117 B2 * | 12/2003 | Weare et al. ................. 84/668 |
| 6,772,113 B1 * | 8/2004 | Fujita et al. ................ 704/219 |

* cited by examiner

SYSTEM AND METHOD FOR MUSIC IDENTIFICATION

TECHNICAL FIELD

The technical field is music systems and, in particular, the identification of music.

BACKGROUND

Current methods for identifying a song in a database are based on feature extraction and matching. U.S. Pat. No. 5,918,223 discloses feature extraction techniques for content analysis in order to retrieve songs based on similarity. U.S. Pat. No. 6,201,176 similarly discloses feature extraction used for retrieving songs based on minimum feature distance. In another method, features, such as loudness, melody, pitch and tempo, may be extracted from a hummed song, for example, and decision rules are applied to retrieve probable matches from a database of songs. However, it is difficult to derive reliable features from music samples. Additionally, feature matching is sensitive to the distortions of imperfect acquisition, such as improper humming, and also to noise in microphone-recorded music samples. Therefore, feature matching has not resulted in reliable searches from recorded samples.

Other methods for identifying a song in a database do not involve processing audio data. For example, one method involves the use of a small appliance that is capable of recording the time of day. The appliance is activated when the user is interested in a song that is currently playing on the radio. The appliance is coupled to a computer system that is given access to a website operated by a service. The user transmits the recorded time to the website using the appliance and provides additional information related to location and the identity of the radio station which played the song. This information is received by the website together with play list timing information from the radio station identified. The recorded time is cross-referenced against the play list timing information. The name of the song and the artist are then provided to the user by the service through the website. Unfortunately, this method requires that the user remember the identity of the radio station that played the song when the appliance was activated. Additionally, the radio station must subscribe to the service and possess the supporting infrastructure necessary to participate in the service. Furthermore, the method is only effective for identifying music played on the radio, and not in other contexts, such as cinema presentations.

SUMMARY

A system and method for identifying music comprising recording a sample of audio data and deriving a sample time signal from the audio data. A plurality of songs represented by time signals is sorted and the sample time signal is matched with the time signal of a song in the plurality of songs.

A system and method for identifying music comprising recording a sample of audio data and deriving a sample time signal from the audio data. The sample time signal is matched with a time signal of a plurality of time signals in a database, wherein each of the plurality of times signals represents a song in the database.

A method for identifying music comprising recording a sample of audio data and generating a first plurality of time signals from the sample of audio data, wherein the first plurality of time signals are generated in distinct frequency bands. A second plurality of time signals is generated from songs in a database, wherein the second plurality of time signals are generated in the same distinct frequency bands as the first plurality of time signals. The first plurality of time signals are matched with the second plurality of time signals.

Other aspects and advantages will become apparent from the following detailed description, taken in conjunction with the accompanying figures.

DESCRIPTION OF THE DRAWINGS

The detailed description will refer to the following drawings, wherein like numerals refer to like elements, and wherein.

DETAILED DESCRIPTION

Figure 1:
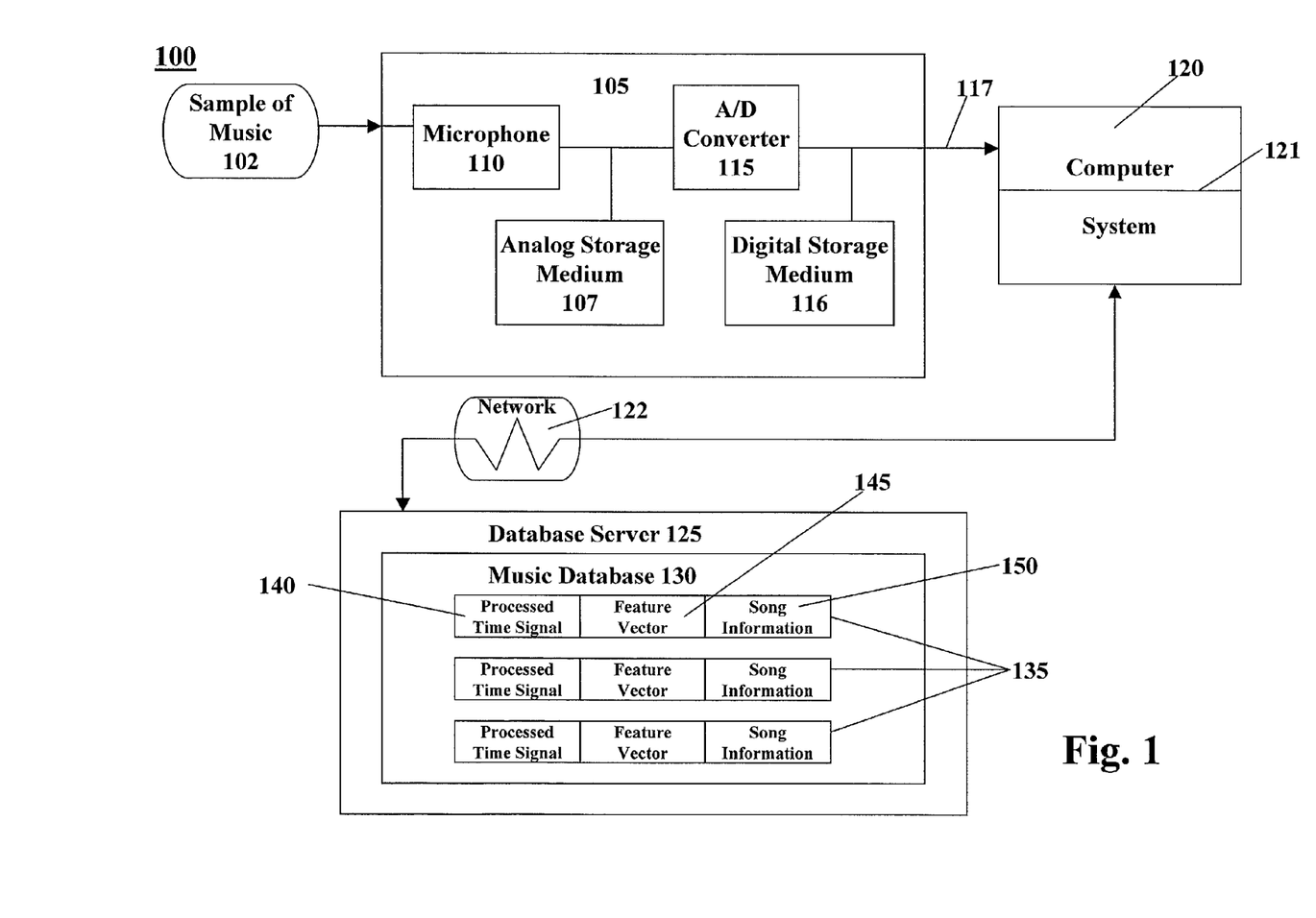
FIG. 1 is a block diagram illustrating a first embodiment of a system for music identification.

FIG. 1 is a block diagram 100 illustrating a first embodiment of a system for music identification. A capture device 105 is used to record a sample of music, or audio data, 102 from various devices capable of receiving and transmitting audio signals, including, for example, radios, televisions and multimedia computers. Samples of music may also be recorded from more direct sources, including, for example, cinema presentations. The capture device 105 may include a microphone 110 and an A/D converter 115. Additionally, the capture device 105 may also include an optional analog storage medium 107 and an optional digital storage medium 116. The capture device 105 may be a custom made device. Alternatively, some or all components of the capture device 105 may be implemented through the use of audio tape recorders, laptop or handheld computers, cell phones, watches, cameras and MP3 players equipped with microphones.

The sample of music 102 is recorded by the capture device 105 in the form of an audio signal using the microphone 110. The A/D converter unit 115 converts the audio signal of the recorded sample to a sample time signal 117. Alternatively, the audio signal of the recorded sample may be stored in the optional analog storage medium 107. The capture device 105 transmits the sample time signal 117 to a digital processing system, such as a computer system 120. Alternatively, the sample time signal 117 may be stored in the optional digital storage medium 116 for uploading to the computer system 120 at a later time. The computer system 120 is capable of processing the sample time signal 117 into a compressed form to produce a processed sample time signal 121. Alternatively, the sample time signal 117 may be processed by a separate processor unit before being transmitted to the computer system 120. The computer system 120 is also capable of accessing a remote database server 125 that includes a music database 130. The computer system 120 may communicate with the database server 125 through a network 122, such as for example, the Internet, by conventional land-line or wireless means. Additionally, the database server 125 may communicate with the computer system 120. Alternatively, the database server 125 may reside in a local storage device of computer system 120.

The music database 130 includes a plurality of songs, where each song may be represented by a database entry 135. The database entry 135 for each song is comprised of a processed time signal 140, a feature vector 145 and song information 150. The processed time signal 140 for each song represents the entire song. The song information 150 may include, for example, song title, artist and performance. Additionally, the song information 150 may also include price information and other related commercial information.

The feature vector 145 for a song in the music database 130 is determined by generating a spectrogram of the processed time signal 140 for the song and then extracting features from the spectrogram. Various techniques related to discrete-time signal processing are well known in the art for generating the spectrogram. Alternatively, the feature vector 45 for a song may be extracted from the original, unprocessed time signal for the song. The features are represented by numeric values, and loosely represent specific perceptual musical characteristics, such as, for example, pitch, tempo and purity. In a first embodiment, the feature vector 145 for each song in the database 130 includes five feature components derived from the projection of a spectrogram in the time (X) and frequency (Y) axes. The first feature is the Michelson contrast in the X direction, which represents the level of "beat" contained in a song sample. The second feature represents the amount of "noise" in the Y direction, or the "purity" of the spectrum. The third feature is the entropy in the Y direction, which is calculated by first normalizing the Y projection of the spectrogram to be a probability distribution and then computing the Shannon entropy. The fourth and fifth features are the center of mass and the moment of inertia, respectively, of the highest three spectral peaks in the Y projected spectrogram. The fourth and fifth features roughly represent the tonal properties of a song sample. Features representing other musical characteristics may also be used in the feature vectors 145.

In a first method for identifying music according to the first embodiment, described in detail below, the sample of music 102 is converted into the sample time signal 117 and transmitted to the computer system 120. The computer system 120 processes the sample time signal 117 to produce a processed sample time signal 121. The computer system 120 applies a signal matching technique with respect to the processed sample time signal 121 and the processed time signals 140 of the music database 130 to select a song corresponding to the best match. The song information 150 corresponding to the selected song is presented to the user.

Figure 2:
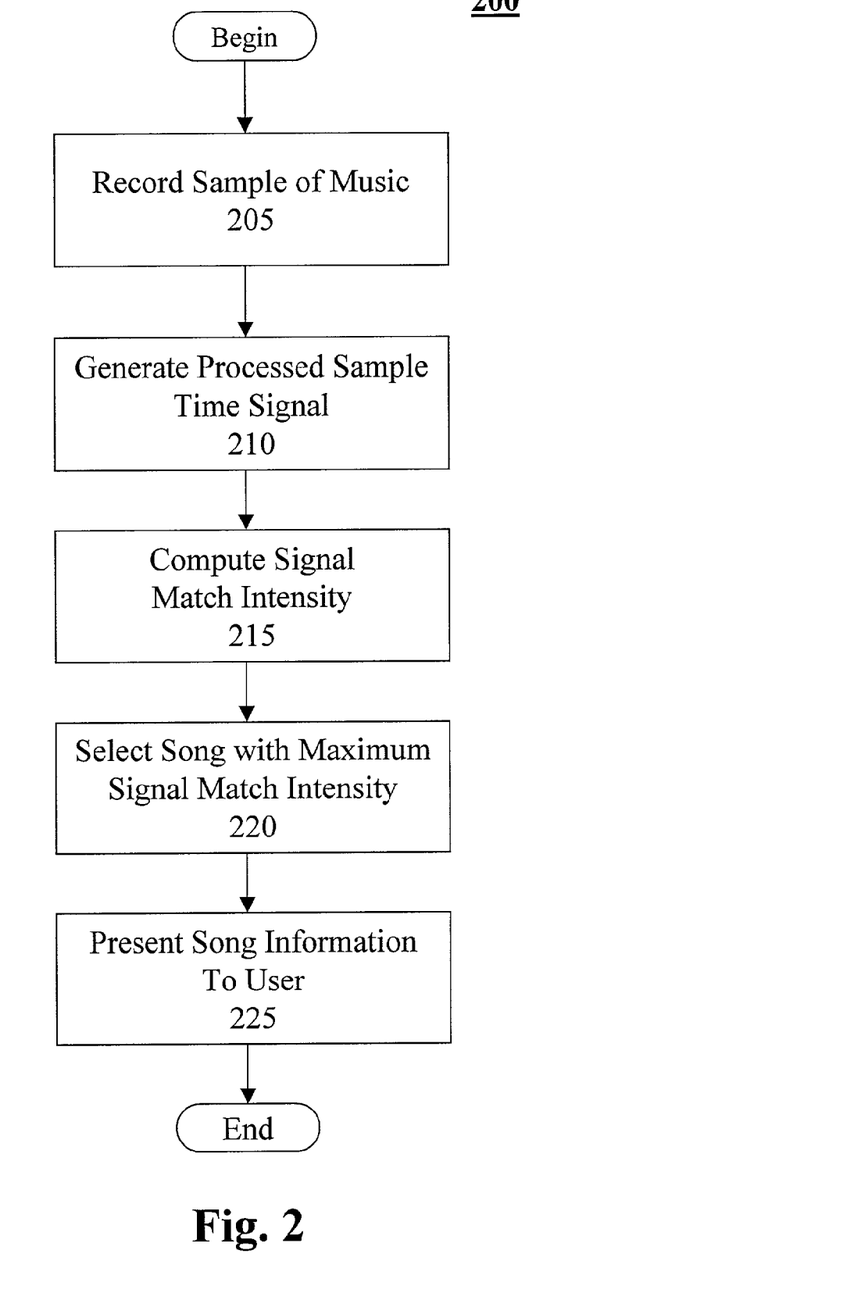
FIG. 2 is a flow chart illustrating a first method for identifying music according to the first embodiment.

FIG. 2 is a flowchart 200 illustrating a first method for identifying music according to the first embodiment. In step 205 the sample of music 102 is recorded by the capture device 105 and converted into the sample time signal 117. The sample of music 102 may be recorded, for example, at 44.1 KHz for approximately eight seconds. However, it is understood that one of ordinary skill in the art may vary the frequency and time specifications in recording samples of music.

In step 210 the sample time signal 117 is transmitted to the computer system 120 and is processed by the computer system 120 to generate a processed sample time signal 121. The processed sample time signal 121 may be generated by converting the sample time signal 117 from stereo to mono and filtering the sample time signal 117 using a zero-phase FIR filter with pass-band edges at 400 and 800 Hz and stopband edges at 200 and 1000 Hz. The filter's lower stop-band excludes potential 50 or 60 Hz power line interference. The upper stop-band is used to exclude aliasing errors when the sample time signal 117 is subsequently subsampled by a factor of 21. The resulting processed sample time signal 121 may be companded using a quantizer response that is halfway between linear and A law in order to compensate for soft volume portions of music. The processed sample time signal 121 may be companded as described in pages 142–145 in DIGITAL CODING OF WAVEFORMS, Jayant and Noll, incorporated herein by reference. Other techniques related to digital coding of waveforms are well known in the art and may be used in the processing of processed sample time signal 121. Additionally, it is understood that one of ordinary skill in the art may vary the processing specifications as desired in converting the sample time signal 117 into a more convenient and useable form.

Similar processing specifications are used to generate the processed time signals 140 in the music database 130. The storage requirements for the processed time signals 140 are reduced by a factor of 84 compared to their original uncompressed size. The details of the filters and the processing of processed sample time signal 121 may differ from that of processed time signals 140 in order to compensate for microphone frequency response characteristics.

In step 215 a signal match intensity is computed using a cross-correlation between the processed sample time signal 121 and each processed time signal 140 in the music database 130. A normalized cross-correlation is interpreted to be the cosine of the angle between the recorded processed sample time signal 121, u, and portions, $v_i$, of the processed time signals 140 of database entries 135 in the music database 130:

$$\cos(\theta) = \frac{u^T v_i}{\|u\| \|v_i\|} \quad (1)$$

Standard cross-correlation may be implemented using FFT overlap-save convolutions. The normalized cross-correlation in Equation 1 may also be implemented with the aid of FFT overlap-save convolution. The normalization for $\|u\|$ is precomputed. The normalization for $\|v_i\|$ is computed with the aid of the following recursion for intermediate variable, $s_i$:

$$s_i = \sum_{j=i}^{i+n-1} e_j^2, \, s_{i+1} = s_i + e_{i+n}^2 - e_i^2 \quad (2)$$

where $v_i = (e_i, e_{i+1}, \ldots, e_{i+n-})$ is a 16384 dimensional portion of the processed time signals 140 in the music database 130 for the song that is being matched. The pole on the unit circle in the recursion of Equation 2 causes floating point calculations to accumulate errors. Exact calculation, however, is possible using 32 bit integer arithmetic, since the inputs are 8 bit quantities and 32 bits is sufficiently large to store the largest possible result for n=16384. During step 215, the maximum absolute value of the normalized cross-correlation is stored to be used later in step 220.

In step 220 the song with the maximum absolute value of the normalized cross-correlation is selected. The song information 150 for the selected song, including title, artist and performance, is presented to a user in step 225.

Figure 3:
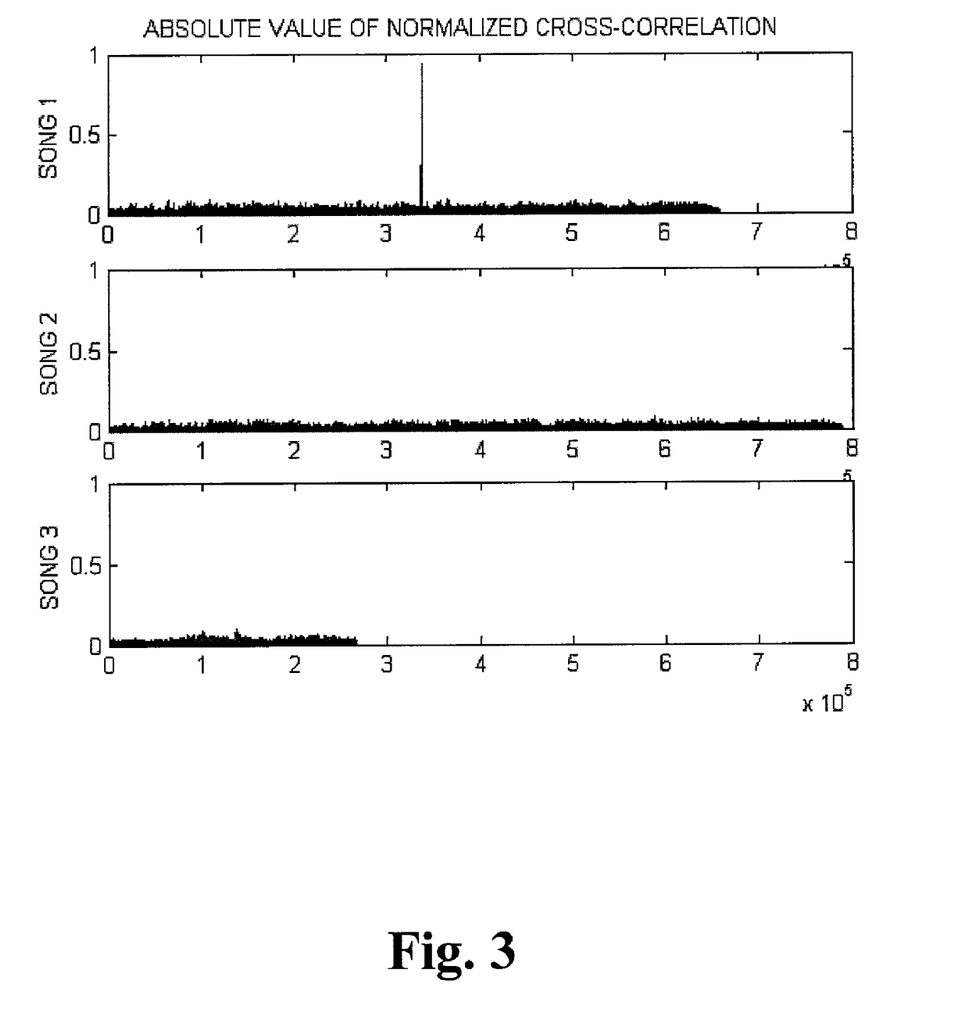
FIG. 3 is a diagram showing subplots demonstrating signal matching in a three song database experiment.

The effectiveness of the signal match technique described in step 215 is illuminated in FIG. 3, which shows subplots demonstrating signal matching in a three song database experiment. The subplots show the absolute value of normalized cross-correlation between a processed time signal obtained from a recorded sample of music and the processed time signals for the three songs in the database. An eight second portion of the first song, SONG 1, was played through speakers and sampled to produce a processed time signal. The method described in FIG. 2 was applied to generate a normalized cross-correlation for each of the three songs in the database. The large peak near the center of the first subplot demonstrates that the signal match intensity is greatest for SONG 1. No peaks exist in the subplots for SONG 2 or SONG 3 because the processed time signal was taken from SONG 1. In addition, the correlation values for the other parts of SONG 1 are also quite low. The low values are likely due to the long samples used (eight seconds), so that in the signal representation there is enough random variation in the song performance to make the match unique. The results of FIG. 3 show that a correctly matching song can be easily recognized.

In a second method for identifying music according to the first embodiment, described in detail below, the sample of music 102 is converted into the sample time signal 117 and transmitted to the computer system 120. The computer system 120 processes the sample time signal 117 to produce a processed sample time signal 121 and extracts features from the processed sample time signal 121 to generate a sample feature vector. Alternatively, the sample feature vector may be extracted directly from the sample time signal 117. As described above, the feature vectors 145 for the songs in the music database 130 are generated at the time each song is added to the music database 130. The database entries 135 in the music database 130 are sorted in ascending order based on feature space distance with respect to the sample feature vector. The computer system 120 applies a signal matching technique with respect to the processed sample time signal 121 and the processed time signals 140 of the sorted music database 130, beginning with the first processed time signal 140. If a signal match waveform satisfies a decision rule, described in more detail below, the song corresponding to the matched processed time signal 140 is played for a user. If the user verifies that the song is correct, the song information 150 corresponding to the matched processed time signal 140 is presented to the user. If the user indicates that the song is incorrect, further signal matching is performed with respect to the processed sample time signal 121 and the remaining processed time signals 140 in the sorted order.

Figure 4:
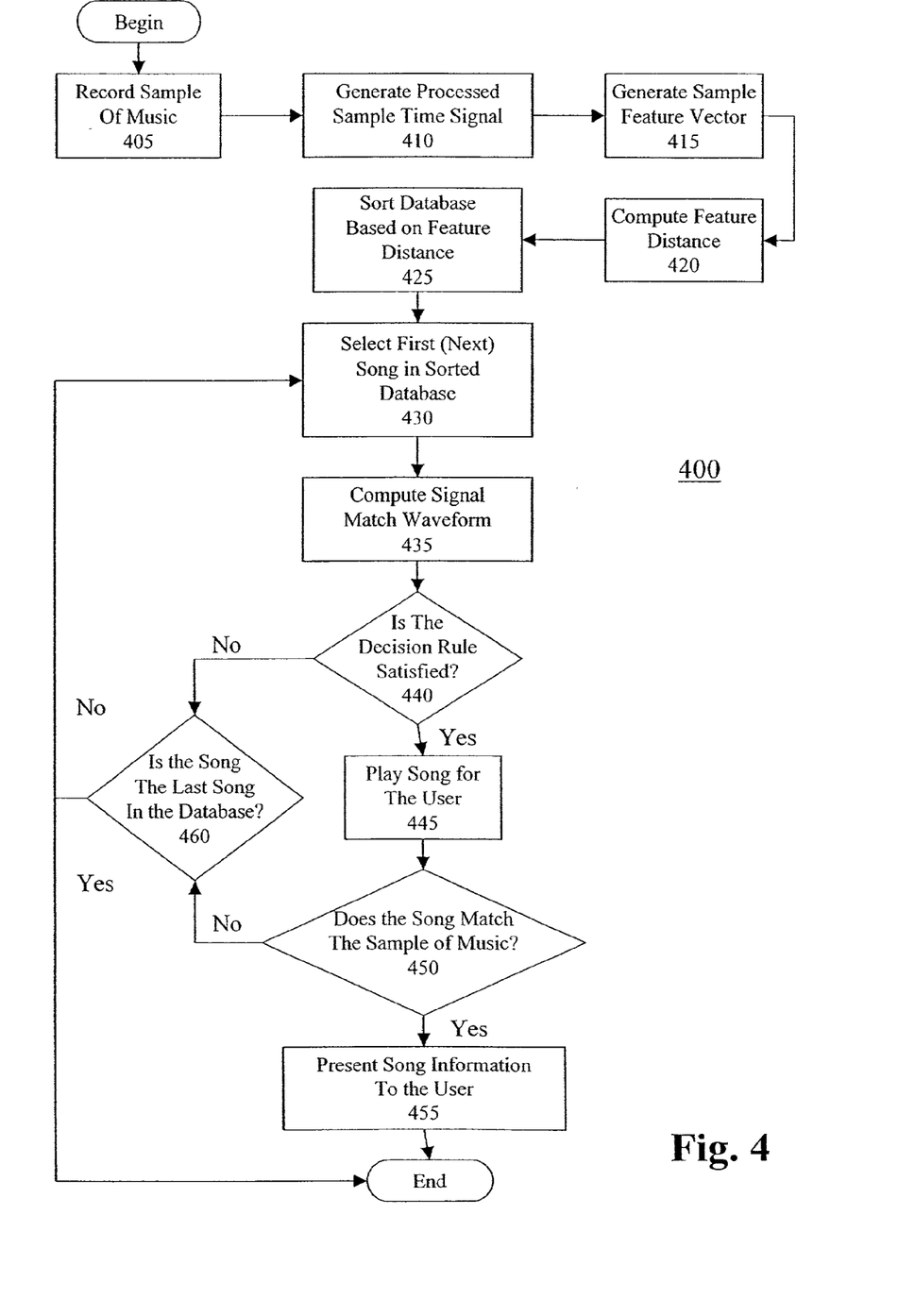
FIG. 4 is a flow chart illustrating a second method for identifying music according to the first embodiment.

FIG. 4 is a flow chart 400 illustrating a second method for identifying music according to the first embodiment. The details involved in steps 405 and 410 are similar to those involved in steps 205 and 210 of the flowchart 200 shown in FIG. 2.

In step 415 a sample feature vector for the processed sample time signal 121 is generated as described above with respect to the feature vectors 145 of the songs in the music database 130. The features extracted from the processed sample time signal 121 are the same features extracted for the songs in the music database 130. Each feature vector 145 may be generated, for example, at the time the corresponding song is added to the music database 130. Alternatively, the feature vectors 145 may be generated at the same time that the sample feature vector is generated.

In step 420 the distance between the sample feature vector and the database feature vectors 145 for all of the songs in the music database 130 is computed. Feature distance may be computed using techniques known in the art and further described in U.S. Pat. No. 6,201,176, incorporated herein by reference. In step 425 the database entries 135 are sorted in an ascending order based on feature space distance with respect to the sample feature vector. It should be clear to those skilled in the art that steps 420 and 425 may be replaced with implicit data structures, and that an explicit sort of the entire music database 130 is not necessary.

In step 430 a first (or next) song in the sorted list is selected and a signal match waveform is computed in step 435 for the processed time signal 140 corresponding to the selected song in relation to the processed sample time signal 121. The specifications involved in computing the signal match waveform in step 435 are similar to those described above for computing the signal match intensity in step 215 of flowchart 200. However, in step 435 the entire waveform is used in the subsequent processing of step 440, described in detail below, instead of using only the signal match intensity value.

In step 440 a decision rule is applied to determine whether the current song is to be played for the user. Factors that may be considered in the decision rule include, for example, the signal match intensity for the current song in relation to the signal match intensities for the other songs in the music database 130 and the number of false songs already presented to the user. In FIG. 3, the peak in the signal matching subplot for SONG 1 is clearly visible. The peak represents a match between a sample of music and a song in a database. The decision rule identifies the occurrence of such a peak in the presence of noise. Additionally, in order to limit the number of false alarms (i.e. wrong songs presented to the user) the decision rule may track the number of false alarms shown and may limit the false alarms by adaptively modifying itself.

In one implementation of the decision rule the signal match waveform computed in step 435 includes a signal cross-correlation output. The absolute value of the cross-correlation is sampled over a predetermined number of positions along the output. An overall absolute maximum of the cross-correlation is computed for the entire song. The overall absolute maximum is compared to the average of the cross-correlations at the sampled positions along the signal cross-correlation output. If the overall absolute maximum is greater than the average cross-correlation by a predetermined factor, then the current song is played for the user.

In another implementation of the decision rule, the current song is played for the user only if the overall absolute maximum is larger by a predetermined factor than the average cross-correlation and no false alarms have been presented to the user. If the user has already been presented with a false alarm, then the decision rule stores the maximum cross correlation for each processed time signal 140 in the music database 130. The decision rule presents the user with the song corresponding to the processed time signal 140 with the maximum cross-correlation. This implementation of the decision rule limits the number of false songs presented to the user.

Another implementation of the decision rule may use a threshold to compare maximum cross-correlation for the processed time signals 140 for the songs in the music database 130 in relation to the processed sample time signal 121. It is understood that variations based on statistical decision theory may be incorporated into the implementations of the decision rule described above.

If the decision rule is satisfied, the current song is played for the user in step 445. In step 450 the user confirms whether the song played matches the sample of music recorded earlier. If the user confirms a correct match, the song information 150 for the played song is presented to the user in step 455 and the search ends successfully. If the decision rule is not satisfied in step 440, the next song in the sorted list is retrieved in step 430 and steps 430–440 are repeated until a likely match is found, or the last song in the sorted list is retrieved in step 460. Similarly, if the user does not confirm a match in step 450, steps 430–450 are repeated for the songs in the sorted list until the user confirms a correct match in step 450, or the last song in the sorted list is retrieved in step 460.

The features extracted in step 415 and the feature vectors 145 for the songs in the music database 130 are used to sort the order in which the signal matching occurs in step 435. The feature-ordered search, together with the decision rule in step 440 and the "human-in-the-loop" confirmation of step 450 results in the computationally expensive signal matching step 435 being applied to fewer songs in order to find the correct song.

In another embodiment, a plurality of processed time signals in distinct frequency bands may be generated from the recorded sample of music 102. In addition, a plurality of processed time signals in the same frequency bands may be generated from the database entries 135. The signals in the individual bands may be matched with each other using normalized cross-correlation or some other signal matching technique. In this case, a decision rule based, for example, on majority logic can be used to determine signal strength. A potential advantage of this embodiment may be further resistance to noise or signal distortions.

In another embodiment, multiple feature vectors may be generated for one or more songs in the music database 130. The multiple feature vectors are generated from various segments in a song. Separate entries are added to the music database 130 for each feature vector thus generated. The music database 130 is then sorted in an ascending order based on feature space distance between a sample feature vector taken from a sample of music and the respective feature vectors for the entries. Although this may increase the size of the music database 130, it may reduce search times for songs having multiple segments with each segment possessing distinct features.

While the present invention has been described in connection with an exemplary embodiment, it will be understood that many modifications will be readily apparent to those skilled in the art, and this application is intended to cover any variations thereof.

What is claimed is:

1. A method for identifying music, comprising the steps of:
    (a) recording a sample of audio data of the music to be identified;
    (b) deriving a processed sample time signal from the audio data by filtering and downsampling the sample of audio data;
    (c) sorting a plurality of songs, wherein each song is represented by a processed time signal, said processed time signals comprising time signals that have been processed through filtering and downsampling; and
    (d) matching the processed sample time signal with the processed time signal of a song in the plurality of songs.

2. The method of claim 1, where the sorting step further comprises:
    generating a sample feature vector for the processed sample time signal;
    generating a feature vector for each processed signal of the songs; and
    sorting the songs in an ascending order based on feature space distance between the sample feature vector and respective feature vectors for each processed time signal of the songs.

3. The method of claim 2, where the generating steps further comprise extracting features from the processed sample time signal and the processed time signals of the songs.

4. The method of claim 3, where the features comprise beat, noise, tone, pitch, loudness and tempo.

5. The method of claim 1, where the sorting step further comprises:
    generating a sample feature vector for the processed sample time signal;
    generating a plurality of feature vectors for one or more processed time signals of the songs, wherein each feature vector of the plurality of feature vectors for a processed time signal is generated from a different segment of the song corresponding to the processed time signal;
    separating the plurality of feature vectors for each processed time signal as distinct entries; and
    sorting the entries in an ascending order based on feature space distance between the sample feature vector and respective feature vectors for the entries.

6. The method of claim 2, where the matching step further comprises:
    comparing the processed sample time signal to a first processed signal in the ascending order;
    computing a signal match waveform for the first time signal in relation to the processed sample time signal;
    playing the song corresponding to the first processed time signal if the signal match waveform satisfies a decision rule;
    indicating by a user whether the played song matches the sample of audio data; and
    presenting to the user song information corresponding to the first processed time signal if the user indicates a match.

7. The method of claim 6, where the signal match waveform is computed by calculating a cross-correlation of the first processed time signal in relation to the processed sample time signal.

8. The method of claim 7, where the decision rule is satisfied if an overall absolute maximum of the cross-correlation, computed for the first processed time signal is greater than an average cross-correlation by a predetermined factor.

9. The method of claim 7, where the decision rule is satisfied if an overall absolute maximum of the cross-correlation computed for the first processed time signal is greater than an average cross-correlation by a predetermined factor, and no incorrect songs have been presented to the user.

10. The method of claim 6, where the song information comprises song title, artist and performance.

11. The method of claim 6, further comprising, alter the computing step, the step of:
    comparing the processed sample time signal to a next processed time signal in the ascending order, and subsequently repeating the computing step with respect to the next processed time signal, if the signal match waveform does not satisfy the decision rule for the first processed time signal.

12. The method of claim 6, further comprising the step of:
    comparing the processed sample time signal to a next time signal in the ascending order, and subsequently repeating the computing, playing, indicating and presenting steps with respect to the next processed time signal, if the user indicates that the played song does not match the sample of audio data.

13. A system for identifying music, comprising:
a means for recording a sample of audio data of the music to be identified;
a means for deriving a processed sample time signal from the audio data, said means for deriving being configured to filter and downsample the sample of audio data;
a means for sorting a plurality of songs, wherein each song is represented by a processed time signal, and wherein the processed time signals comprise time signals that have been processed through filtering and downsampling; and
a means for matching the processed sample time signal with the processed time signal of a song in the plurality of songs.

14. The system of claim 13, where the means for sorting further comprises:
a means for generating a sample feature vector for the processed sample time signal;
a means for generating a feature vector for each processed time signal of the songs; and
a means for sorting the songs in an ascending order based on feature space distance between the sample feature vector and respective feature vectors for each processed time signal of the songs.

15. The system of claim 14, where the means for generating a sample feature vector and the means for generating a feature vector for each time signal of the songs further comprise a means for extracting features from the processed sample time signal and the processed time signals of the songs.

16. The system of claim 15, where the features comprise beat, noise, tone, pitch, loudness and tempo.

17. The system of claim 13, where the means for sorting further comprises:
a means for generating a sample feature vector for the processed sample time signal;
a means for generating a plurality of feature vectors for one or more processed time signals of the songs, wherein each feature vector of the plurality of feature vectors for a processed time signal is generated from a different segment of the song corresponding to the processed time signal;
a means for separating the plurality of feature vectors for each processed time signal as distinct entries; and
a means for sorting the entries in an ascending order based on feature space distance between the sample feature vector and respective feature vectors for the entries.

18. The system of claim 14, where the means for matching further comprises:
a means for comparing the processed sample time signal to a first processed time signal in the ascending order;
a means for computing a signal match waveform for the first processed time signal in relation to the processed sample time signal;
a means for playing the song corresponding to the first processed time signal if the signal match waveform satisfies a decision rule;
a means for indicating by a user whether the played song matches the sample of audio data; and
a means for presenting to the user song information corresponding to the first processed time signal if the user indicates a match.

19. The system of claim 18, where the signal match waveform is computed by calculating a cross-correlation of the first processed time signal in relation to the processed sample time signal.

20. The system of claim 19, where the decision rule is satisfied if an overall absolute maximum of the cross-correlation computed for the first processed time signal is greater than an average cross-correlation by a predetermined factor.

21. The system of claim 19, where the decision rule is satisfied if an overall absolute maximum of the cross-correlation computed for the first processed time signal is greater than an average cross-correlation by a predetermined factor, and no incorrect songs have been presented to the user.

22. The system of claim 18, where the song information comprises song title, artist and performance.

23. A method for identifying music, comprising the steps of:
(a) recording a sample of audio data of the music to be identified;
(b) deriving a processed sample time signal from the audio data by filtering and downsampling the sample of audio data; and
(c) matching the processed sample time signal with a processed time signal of the plurality of processed time signals in a database, wherein each of the plurality of processed times signals represents a song in the database, and wherein each of the processed time signals comprise time signals that have been processed through filtering and downsampling.

24. The method of claim 23, where the matching step further comprises:
computing a signal match intensity for the plurality of processed time signals in the database in relation to the processed sample time signal;
selecting a processed time signal of the plurality of processed time signals having a maximum signal match intensity; and
presenting to a user song information corresponding to the selected processed time signal.

25. The method of claim 24, where the song information comprises song title, artist and performance.

26. A system for identifying music, comprising:
a means for recording a sample of audio data of the music to be identified;
a means for deriving a processed sample time signal from the audio data, wherein said means for deriving is configured to filter and downsample the sample of audio data; and
a means for matching the processed sample time signal with a processed time signal of the plurality of processed time signals in a database, wherein each of the plurality of processed time signals represents a song in the database, and wherein each of the plurality of processed time signals comprise time signals that have been processed through filtering and downsampling.

27. The system of claim 26, where the means for matching further comprises:
a means for computing a signal match intensity for the plurality of processed time signals in the database in relation to the processed sample time signal;
a means for selecting a processed time signal of the plurality of processed time signals having a maximum signal match intensity; and
a means for presenting to a user song information corresponding to the selected processed time signal.

28. The method of claim 27, where the song information comprises song title, artist and performance.

29. A method for identifying music, comprising the steps of:
(a) recording a sample of audio data of the music to be identified;
(b) generating a first plurality of processed time signals from the sample of audio data, wherein the first plurality of processed time signals are generated in distinct frequency bands;
(c) generating a second plurality of processed time signals from songs in a data base, wherein the second plurality of processed time signals are generated in the same distinct frequency bands as the first plurality of time signals; and
(d) matching the first plurality of processed time signals with the second plurality of processed time signals.

* * * * *